US012639626B2

(12) United States Patent
Crockett et al.

(10) Patent No.: US 12,639,626 B2
(45) Date of Patent: May 26, 2026

(54) VECTORIZED FUZZY STRING MATCHING PROCESS

(71) Applicant: Steady Platform LLC, Atlanta, GA (US)

(72) Inventors: Nathan Crockett, Atlanta, GA (US); Jason Robinson, Atlanta, GA (US); Tyler Howard, Atlanta, GA (US); Andrew Toloff, Atlanta, GA (US)

(73) Assignee: STEADY PLATFORM, INC., Atlanta, GA (US)

( * ) Notice: Subject to any disclaimer, the term of this patent is extended or adjusted under 35 U.S.C. 154(b) by 861 days.

(21) Appl. No.: 17/888,630

(22) Filed: Aug. 16, 2022

(65) Prior Publication Data

US 2024/0062099 A1     Feb. 22, 2024

(51) Int. Cl.
*G06N 20/00*     (2019.01)
*G06F 16/35*     (2025.01)

(52) U.S. Cl.
CPC ............. *G06N 20/00* (2019.01); *G06F 16/35* (2019.01)

(58) Field of Classification Search
CPC ............................... G06N 20/00; G06F 16/35
See application file for complete search history.

(56) References Cited

U.S. PATENT DOCUMENTS

| | | | |
|---|---|---|---|
| 10,460,391 B2 | 10/2019 | Caldwell | |
| 10,510,113 B2 | 12/2019 | Caldwell | |
| 10,984,468 B1 | 4/2021 | Hockey et al. | |
| 2018/0218448 A1 | 8/2018 | Thomas et al. | |
| 2019/0066203 A1 | 2/2019 | Smith et al. | |
| 2020/0137080 A1 | 4/2020 | Bloomquist et al. | |
| 2021/0233162 A1 | 7/2021 | Hockey et al. | |
| 2021/0287069 A1* | 9/2021 | Mumcuyan | G06F 18/214 |
| 2021/0326980 A1 | 10/2021 | Thomas et al. | |
| 2023/0012602 A1* | 1/2023 | Gschwind | G06F 16/24578 |

* cited by examiner

*Primary Examiner* — Casey R. Garner
(74) *Attorney, Agent, or Firm* — Buckley, Maschoff & Talwalkar LLC

(57)          ABSTRACT

Provided are systems and methods for matching two strings together. The process can identify differences between the two strings, store values representing the differences between the two strings in a vector and compare the vectorized string difference values to each other using machine learning. In one example, a method may include receiving a request to compare a source string and a target string, generating a vector and encoding attributes within the vector, wherein the attributes comprise editing steps for converting the source string into the target string, determining whether the source string is a match to the target string via execution of a machine learning model on the generated vector with the attributes encoded therein, and storing a determination output of the machine learning model in memory.

15 Claims, 9 Drawing Sheets

260

| 240 | Source | Target | Lev Dist. | Sub | Del | Ins | Sub Loc. | Del Loc. | Ins Loc. | Ratio | Diff |
|---|---|---|---|---|---|---|---|---|---|---|---|
| 1st Vector = | ROB | ROBERT | 3 | | 3 | | | 0.8 | | 0.5 | 3 |

| 250 | Source | Target | Lev Dist. | Sub | Del | Ins | Sub Loc. | Del Loc. | Ins Loc. | Ratio | Diff |
|---|---|---|---|---|---|---|---|---|---|---|---|
| 2nd Vector = | BAKER | CARTER | 3 | 2 | 1 | | 0.3 | 0.4 | | 0.8 | 1 |

1st String = ROBERT CARTER    2nd String = ROB BAKER 202      204

Levenshtein Distance Matrices

210 / 206

|   |   | R | O | B |
|---|---|---|---|---|
|   | 0 | 1 | 2 | 3 |
| R | 1 | 0 | 1 | 2 |
| O | 2 | 1 | 0 | 1 |
| B | 3 | 2 | 1 | 0 |
| E | 4 | 3 | 2 | 1 |
| R | 5 | 4 | 3 | 2 |
| T | 6 | 5 | 4 | 3 |

220 / 208

|   |   | B | A | K | E | R |
|---|---|---|---|---|---|---|
|   | 0 | 1 | 2 | 3 | 4 | 5 |
| C | 1 | 1 | 2 | 3 | 4 | 5 |
| A | 2 | 2 | 1 | 2 | 3 | 4 |
| R | 3 | 2 | 2 | 2 | 3 | 3 |
| T | 4 | 3 | 3 | 3 | 3 | 4 |
| E | 5 | 4 | 3 | 3 | 3 | 4 |
| R | 6 | 5 | 4 | 4 | 4 | 3 |

FIG. 2B
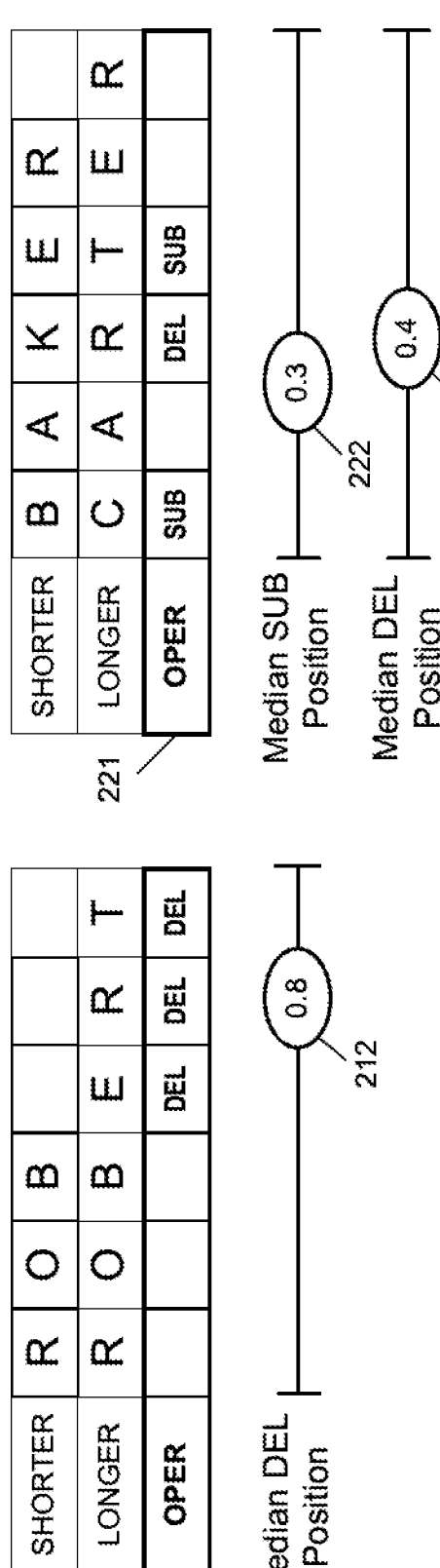
230
| SHORTER | R | O | B | | T |
|---|---|---|---|---|---|
| LONGER | R | O | B | E | R |
| OPER | | | | DEL | DEL |
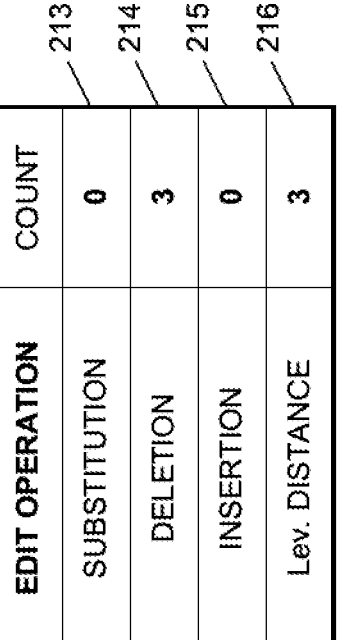
| EDIT OPERATION | COUNT |
|---|---|
| SUBSTITUTION | 0 |
| DELETION | 3 |
| INSERTION | 0 |
| Lev. DISTANCE | 3 |

1st Vector =

| Source | Target | Lev Dist. | Sub | Del | Ins | Sub Loc. | Del Loc. | Ins Loc. | Ratio | Diff |
|--------|--------|-----------|-----|-----|-----|----------|----------|----------|-------|------|
| ROB | ROBERT | 3 | | 3 | | | 0.8 | | 0.5 | 3 |

250

2nd Vector =

| Source | Target | Lev Dist. | Sub | Del | Ins | Sub Loc. | Del Loc. | Ins Loc. | Ratio | Diff |
|--------|--------|-----------|-----|-----|-----|----------|----------|----------|-------|------|
| BAKER | CARTER | 3 | 2 | 1 | | 0.3 | 0.4 | | 0.8 | 1 |

FIG. 3          300
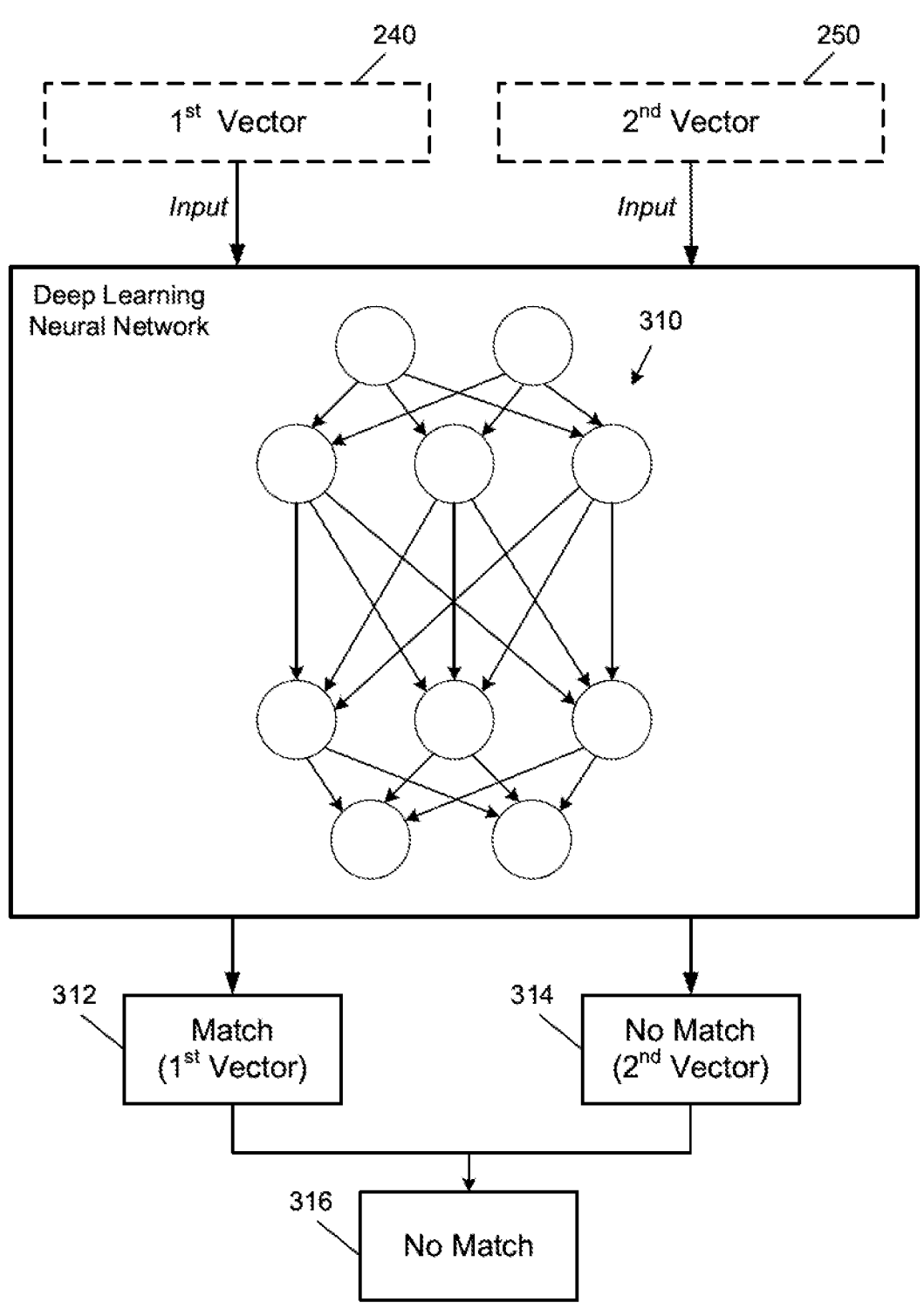

500

Receiving a Request to Compare a
Source String and a Target String

510

Generating a Vector and Encoding Editing Steps for
Converting the Source String into the Target String
Within the Vector

520

Determining Whether the Source String
is a Match to the Target String via Execution of a
ML Model on the Vector

530

Storing a Result of the Determination

540

VECTORIZED FUZZY STRING MATCHING PROCESS

BACKGROUND

Fuzzy string matching is a process of matching together two pieces of text (i.e., strings) that are approximately the same, but not identical. For example, a search engine may receive the term "Connectict" and automatically match the term to the correct term "Connecticut" using a form of fuzzy matching. The process typically relies on a similarity in the text content (e.g., overlapping text in each word). However, it's highly challenging for a machine learning model to be able to correctly identify this fuzzy match, since for a machine learning classifier, the model must typically be trained on such a match (i.e., it must have seen the match before). If, however, the model has not been trained on this particular match, the model will be unable to make the proper classification.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a process of determining a Levenshtein distance value in accordance with example embodiments.

FIG. 2B is a diagram illustrating a process of determining edit operation attributes in accordance with example embodiments.

FIG. 2C is a diagram illustrating a process of generating vectorized string differences in accordance with example embodiments.

FIG. 3 is a diagram illustrating a process of comparing string values via machine learning in accordance with example embodiments.

Figure 1A:
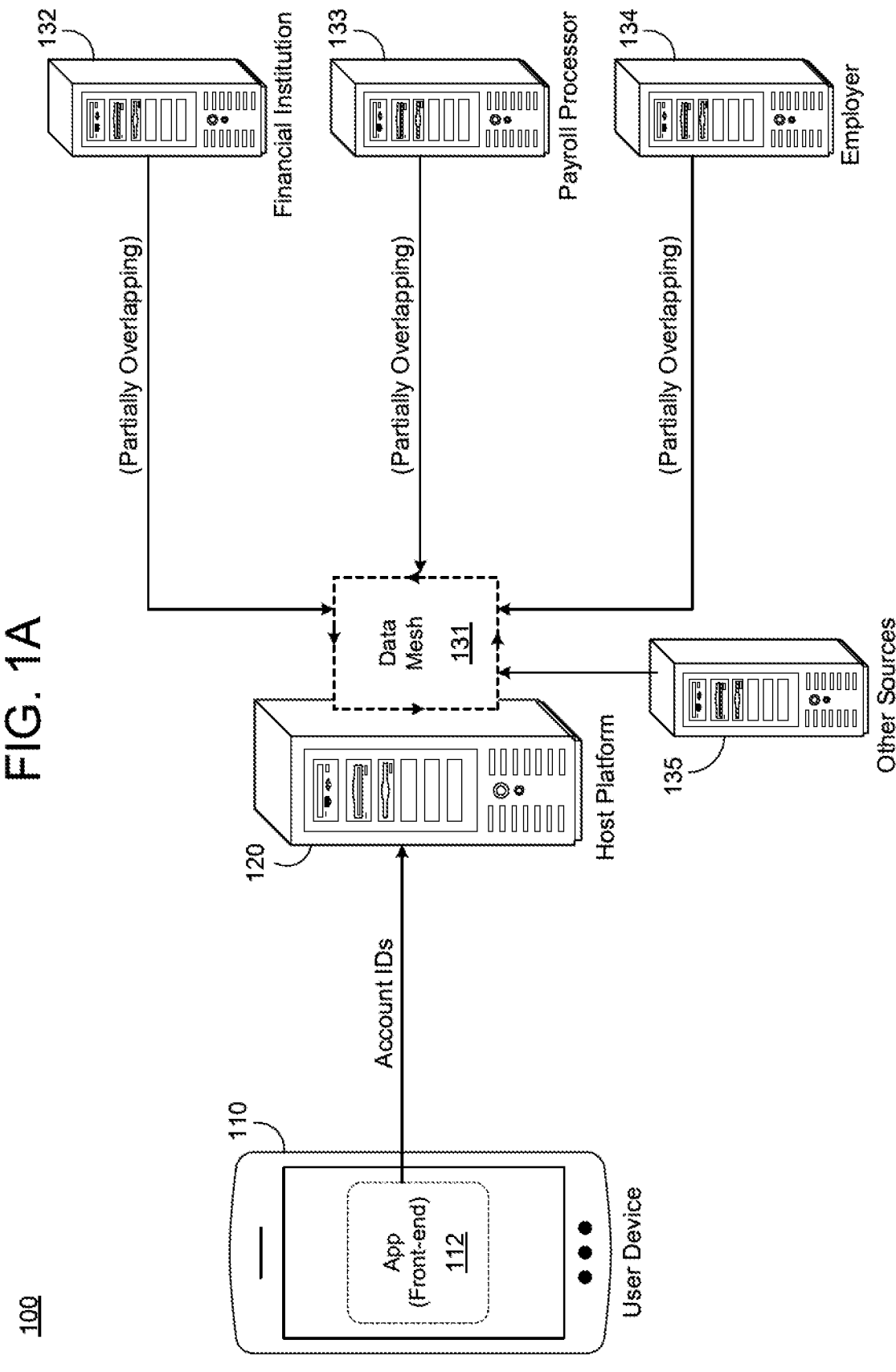
FIG. 1A is a diagram illustrating a process of a host platform building a data mesh in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a reader with a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

The example embodiments are directed to a new type of fuzzy matching algorithm which can match together a source string and a target string based on the editing steps necessary to convert the source string to the target string. For example, attributes such as edit operation types and counts of the number of edit operations may be encoded within a vector. The vector may be input to a machine learning model or rules engine which may be trained to determine whether the source string correspond to a same name (or other text) as a target string based on the edit operation attributes encoded in the vector. In this example, the machine learning model may have never seen the source string matched to the target string, but may still make the associated match based on the edit operation attributes. In some cases, the fuzzy matching described herein can be integrated with other systems and processes related to financial transaction process, however, embodiments are not limited thereto.

In some embodiments, the fuzzy matching described herein may be incorporated with systems which verify and enhance financial transactions. Transaction records can include several pieces of data, for example, a date of the transaction, an amount of the transaction, whether it was a credit or debit, and a transaction string. The transaction string is a collection of text that provides additional detail about the transaction and might include additional description of attributes involved in the transaction such as a name of a counterparty, a geographic location, and the like. Transaction strings are typically unique to a particular financial institution that creates the transaction string. Each financial institution may use different content, different ordering, different variability, and the like, within a transaction string.

The fuzzy matching described herein may be used to match text content from transaction records together. For example, text from a transaction string may be matched to text from another transaction string using the fuzzy matching. The fuzzy matching process may be a pre-processing step for additional operations such as deduplication/deletion of duplicate data records, additional machine learning, eligibility verification, income verification, identity verification, and the like.

When two strings are compared to one another, a source string and a target string are chosen, and a vector is constructed which combines information about the differences between the two strings such as the two strings themselves, a minimum number of edit operations required to change the source string to the target string (i.e., the Levenshtein distance), a number (count) of insert, delete, and substitution operations that make up the total number of edit operations, a number of edit operations that involve specific types of characters (e.g. vowels or numbers), depending on the use case, a measure for where the edit operations occur in the source string (this may include, but is not limited to, the median or mean character location for each type of edit), a ratio of, or difference between, the number of words in the source and target strings, and the like. It should also be appreciated that the elements encoded into the vector may be normalized in different ways.

The vectors may be input into a fuzzy matching model (e.g., machine learning model, rules engine, combination thereof, etc.) to perform fuzzy matching based on the vectors, the purpose of which is to determine if the source and target strings are a match. The interpreting system uses the nature of the edits between the source and target strings, as encoded by the fuzzy match vector, to predict if the two strings are a match. This system could be a static set of limits or rules and/or a machine learning model or models, but is not limited to these. Different interpreting systems can be calibrated to different use cases (e.g., matching names of people, transaction strings, etc.), and may also be calibrated to identify the type of match. For example, output predictions may include categories like: "exact match", "abbreviation", "typo", and "not a match".

The vectorized fuzzy string matching provides a method for determining if two strings correspond to a match in a way that can be customized to different use cases. This customization leads to increased accuracy for each use case. Some examples include predicting and/or assessing the likelihood of whether two names correspond to the same person or entity, especially in scenarios where a first name may be abbreviated in one of the strings (e.g., "William" vs. "Will"), matching transaction strings or components within transaction strings that are similar in form, which may correspond to debits or credits to/from the same company or entity, finding duplicate entries in a list of company names or other entities that may have very similar names, comparing user-entered free form text (such as a company name) to a list of known values and find the closest match, and the like.

There are three types of edit operations, including insertion (adding a character to a string), deletion (removing a character from a string), and substitution (changing one character to another). When comparing two strings, the host platform may perform the following tasks, among other steps to compute additional difference metrics:

1. Choose one string as the source string and one as the target string.
2. Compute the minimum number of character edit operations required to change the source string to the target (i.e., the Levenshtein distance) using standard techniques.
3. Calculate the number of each type of edit operation (insertion, deletion, and substitution) that makes up the total number of operations computed in Step 2 using standard techniques.
4. Calculate the number of operations that involve specific types of characters (e.g., vowels or numbers), depending on the use case.
5. Compute location metrics (e.g., the median character location) for the edit operations described in Steps 2-4.
6. Calculate the ratio of, and difference between, the number of words in the source and target strings.
7. Construct a fuzzy match vector based on the calculations from Steps 1-6.
8. Pass the fuzzy match vector to the interpreting system.
9. The interpreting system returns a probability (or probabilities) indicating if the two strings are a match, and, possibly, the type of match.

Figure 1B:
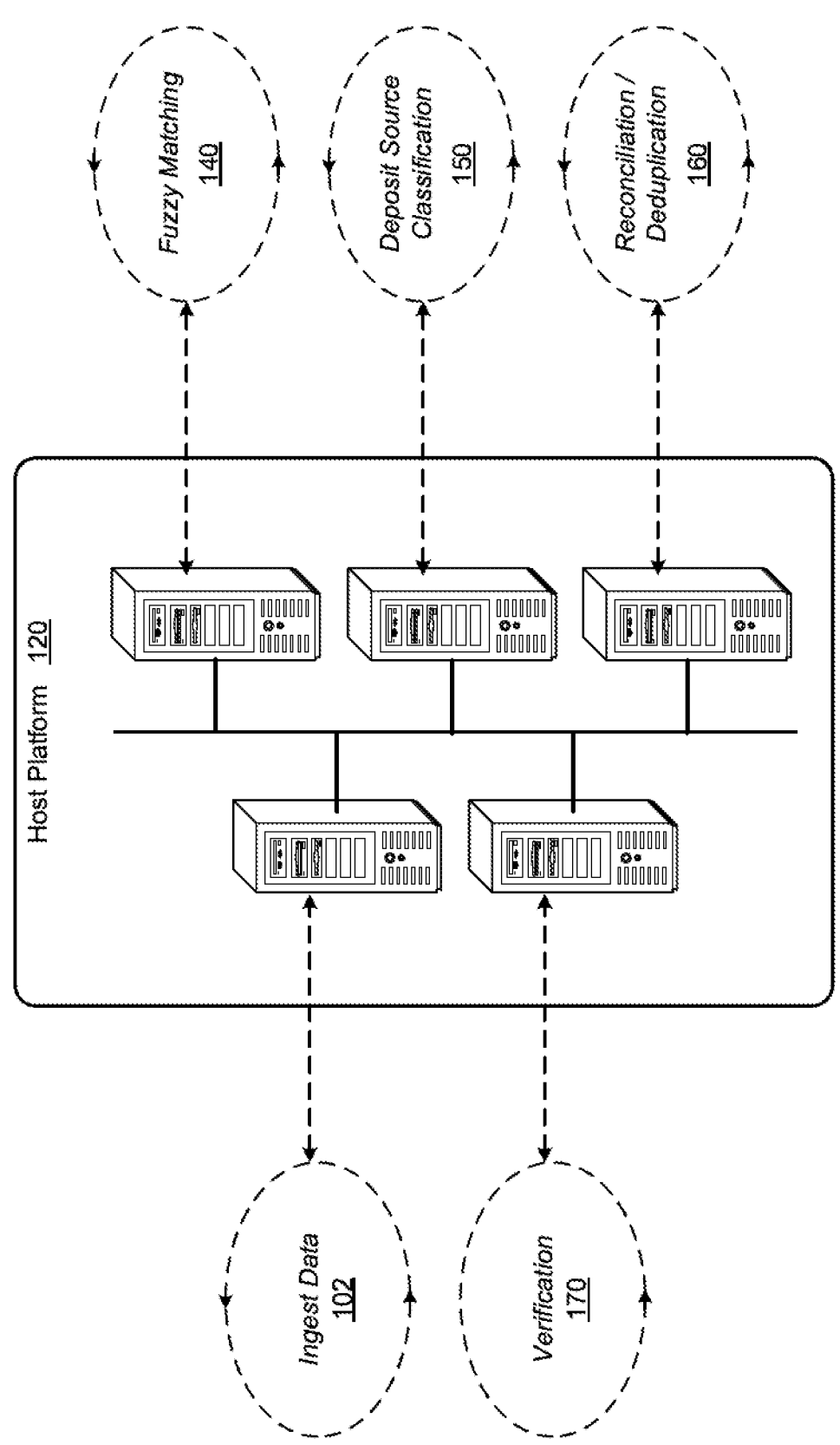
FIG. 1B is a diagram illustrating a processing pipeline of the host platform in accordance with example embodiments.

FIGS. 1A-1B illustrate examples of a host platform 120 that is configured for fuzzy matching in accordance with example embodiments. As an example, the host platform 120 may include one or more of an application server, a cloud platform, a blockchain network, and the like. In some cases, the host platform 120 may include at least one server coupled to a blockchain network with a plurality of peers, however, embodiments are not limited to a decentralized architecture, and may also include a centralized architecture.

For example, FIG. 1A illustrates a process 100 of the host platform 120 building a data mesh 130 based on sources of data (e.g., sources of truth) with data of a user. For example, the data sources may include financial institutions (e.g., banks, credit agencies, lending agencies, etc.), payroll processors (e.g., of an employer), a human resources (HR) platform, an enterprise resource planning (ERP) platform, jobs-related data (e.g., job titles, employer names, and other information relevant to job postings and careers), and the like. An example of ingesting jobs-related data such as job postings and job titles is described in U.S. Provisional Patent Application No. 63/257,613, filed on Oct. 20, 2021, in the United States Patent and Trademark Office, the entire disclosure of which is incorporated herein by reference for all purposes. The data mesh 130 may be generated by combining data records from multiple different data sources (sources of truth) in a partially overlapping fashion enabling the data records to be compared to each other for purposes of verification. The data may include personally-identifiable information (PII) and non-PII data including company data and company names. During this process, fuzzy matching can be used to identify strings or sub-strings which are matches among two records. These matches can be used to determine whether the records are duplicates, and if so, take additional action such as to delete one of the duplicate records, generate a combined record from the two duplicates, and the like. Similarly, this method could be used to identify corresponding records or records that should be logically grouped as being related.

The user may input account numbers/routing numbers, login credentials, and the like, associated with bank accounts, employer accounts (e.g., gig employers, etc.), payroll company accounts, credit accounts, etc., held by trusted sources of truth such as banks, credit agencies, payroll processors, employers/organizations, institutions, and the like. For example, the host platform 120 may output a user interface with one or more input fields displayed therein on the front-end 112 of the application which can receive the account numbers, access credentials, etc. via an application programming interface (API) 122. For example, the mobile device 110 and the host platform 120 may be connected via the Internet, and the front-end 112 may send the information via an HTTP message, an application programming interface (API) call, or the like. When the account identifiers are transmitted, a response containing relevant account information and the like may be received.

In response to receiving the account information, the host platform 120 may register/authenticate itself with various trusted sources of truth where the accounts/user accounts are held/issued. For example, the host platform may perform a remote authentication protocol/handshake with various data sources. In the example of FIG. 1A, the host platform 120 registers within a data source 131 (e.g., a bank of the user, etc.), a data source 132 (e.g., a payroll processor of the employer, etc.), a data source 133 (e.g., an employer server), and other data source 134 (e.g., a credit agency, etc.)

These accounts can be used by the host platform to pull or otherwise query a unique mesh of partially overlapping data sets which can be combined into one larger data set (data mesh 130) and analyzed. In the example embodiments, the combination of data from the different sources of truth (e.g., data source 131, data source 132, data source 133, and other sources 134), can be combined and stored within the data mesh 130 by the host platform 120. The ingested account data may include transaction records with information such as transaction strings, payment amounts, payment dates, geographic location data of the transaction, etc. It should also be appreciated that the user may manually upload data such as documents, bank statements, account credentials, and the like, in a format such as a .pdf, .docx, spreadsheet, XML file, JSON file, etc. Furthermore, optical character recognition (OCR) may be performed on any documents, files, bank statements, etc. obtained by the host platform 120 to extract attributes from such documents and files.

The authentication process may include one or more API calls being made to each of the different third-party services (bank, payroll, employer, etc.) via a backend of the software application on the host platform 120 to establish a secure HTTP or HTTPS communication channel. For example, the backend of the software application may be embedded or otherwise provisioned with access credentials of the user for accessing the different third-party services. The backend may then use these embedded, provisioned, and/or otherwise securely stored credentials to establish or otherwise authenticate itself with the third-party services as an agent of the user. Each authenticated channel may be established though a sequence of HTTP communications between the host platform 120 and the various servers. The result is a plurality of web sessions between the host platform 120 and a plurality of servers, respectively. The host platform 120 can request information/retrieve information from any of the servers, for example, via HTTP requests, API calls, and the like. In response, the user data can be transmitted from the servers to the host platform 120 where it can be combined with the data mesh 130 for further processing.

The ingested data may be enhanced according to various embodiments prior to any verifications being performed in order to further improve the accuracy of the verifications. For example, as shown in FIG. 1B, the host platform may perform a data ingestion process 102 which may include some or all of the steps described in the process 100 of FIG. 1A, a fuzzy matching process 140, a deposit source classification process 150 on the transaction records using transaction strings within the transaction records, a reconciliation and deduplication process 160, and/or one or more verifications 170. The deposit source classification process 150 may build a classifier with mappings between transaction strings and a plurality of predefined categories of transactions (e.g., a plurality of income source types, deposit source types, etc.) using machine learning. As a non-limiting example, the categories may include deposit source classifications that specify a type of credit associated with a payment/credit to the user's account. The categories of such deposit source may include, but are not limited to, payroll, peer-to-peer, alimony, childcare, basic income, grants, miscellaneous, and the like.

In some embodiments, as shown in FIG. 1B, the host platform 120 may execute various processes including a fuzzy matching process 140 to identify matching strings (possibly within the transaction records ingested from the user accounts, or from other data). Examples of the fuzzy matching process are further described with respect to FIGS. 2A-2C.

In addition, the host platform may execute one or more verifications 170 of a user, such as income verification, identity verification, benefit administration eligibility verification, and the like. Before the verifications are performed, the host platform 120 may enhance and/or modify the data records to improve the processing of the machine learning and the data identification.

For example, the host platform may also use machine learning during a deposit source classification process 150 to identify missing counterparties within transaction records. In addition, the host platform 120 may use machine learning to perform a reconciliation and deduplication process 160 for reconciling records and deduplication of the reconciled records. An example of counterparty identification process using machine learning is described in U.S. patent application Ser. No. 17/342,622, filed on Jun. 9, 2021, in the United States Patent and Trademark Office, which is fully incorporated herein by reference for all purposes. An example of reconciliation and deduplication using machine learning is described in U.S. patent application Ser. No. 17/835,044, filed on Jun. 8, 2022, in the United States Patent and Trademark Office, which is also fully incorporated herein by reference for all purposes.

As an example, the reconciliation process may identify whether two transaction records from two different entities (i.e., a payee and a payor, etc.) refer to the same transaction, such that the two transaction records are from the same transaction, but from different perspectives. In this case, the reconciliation process may modify one of the transaction records to include the date from the other transaction record to create a bigger transaction record. To identify whether two or more transactions are duplicates, a deduplication process can be performed to find and then remove duplicates before further processing is performed on the ingested transaction records.

The processed transaction records, including any fuzzy matched strings, deposit source identifications, counterparty identifications, and/or reconciliation and deduplications, may be further processed for purposes of verifying the user of the transaction records. For example, one or more verification processes 170 may be executed by the host platform 120 to verify aspects of the user such as income, identity, eligibility for benefits, and the like. Examples of the verification processes are described in U.S. patent application Ser. No. 17/580,721, filed on Jan. 21, 2022, and U.S. patent application Ser. No. 17/864,589, filed on Jul. 14, 2022, which are fully incorporated herein by reference for all purposes.

In some embodiments, the host platform 120 described herein may include or otherwise be coupled to a blockchain network which may be a public blockchain network or a permissioned/private blockchain network. Examples of the types of blockchain frameworks that can be used include Ethereum, Solana, EOS, Cardano, Hyperledger Fabric, and the like. As an example, an application server may host a mobile application or web application that provides the verification processes described herein. The application server may be coupled to a blockchain network and may transmit results of the verification processes and confirmations of the payments to a blockchain ledger of the blockchain network. The blockchain network may include a plurality of blockchain-enabled peers (e.g., distributed computing machines, virtual machines, etc.) that work together to write to and/or manage the blockchain ledger. In some embodiments, different peers may perform the different process 100, 140, 150, 160, and 170 shown in FIG. 1B. As another example, each of the peers may perform each of the processes, and at the same, execute a consensus with the other peers to ensure agreement before any updates to the ledger can be made.

Each of the blockchain-enabled peers may be a member of the blockchain network and may include a local copy of the blockchain ledger. Depending on the choice of blockchain protocol employed for the particular application, the peers may execute consensus based protocols and network-wide communications including gossip to ensure that no single peer can update the blockchain ledger by themselves and also to ensure that a state of the content stored in the blockchain(s) on the local blockchain ledgers of all of the peers is the same/synchronized. Furthermore, to ensure that the blockchain ledger is "immutable" and cannot be changed, each new block added to the ledger may include a hash pointer to an immediately previous block on the blockchain ledger. For example, a committing peer may hash a value from the previous block (e.g., a block header, block data section, block metadata, or the like) and store the hash value in the new block (e.g., in a block header, etc.).

The blockchain-enabled peers may be trusting entities or untrusting entities with respect to each other. In some embodiments, the blockchain-enabled peers may work together to achieve a consensus (i.e., an agreement) on any data that is added to the blockchain ledger before it is committed. In some cases, peers may have different roles and peers may have multiple roles. As an example, a committing peer refers to a peer that stores a local copy of the blockchain ledger and commits blocks locally to its instance of the blockchain ledger. Most if not all peers in the blockchain network may be committing peers. Prior to the data being committed, peers execute a consensus process of some kind to ensure that the requirements for adding the data to the blockchain ledger (e.g., specified by policy of the blockchain, etc.) has been satisfied. Examples of consensus processes include proof of work, endorsement, proof of stake, proof of history, and the like.

An ordering service or ordering peer may receive transactions which are to be added to the blockchain and order the transactions based on priority (e.g., time of receipt, etc.) into a block. After the block is filled, the ordering service may generate a new block and distribute the block to the committing peers.

In some embodiments, blockchain transactions may require "endorsement" by at least a small subset of peers within the blockchain network before being added to a new block. In this example, an "endorsing" peer may receive a new blockchain transaction to be stored on the blockchain ledger, and perform an additional role of simulating content (e.g., within the blockchain transaction) based on existing content stored on the blockchain ledger to ensure that the blockchain transaction will not have issues or fail. The endorsement process may be performed prior to adding the blockchain transaction to the block by the ordering service. Thus, in that case, only "endorsed" transactions may be added to a new block to be committed to the blockchain ledger. In some embodiments, only a subset of peers (e.g., a small group of trusted systems out of a larger group of systems of the blockchain network, etc.) may endorse transactions.

FIG. 2A illustrates a process 200 of determining a Levenshtein distance value in accordance with example embodiments, FIG. 2B illustrates a process 230 of determining editing operation attributes in accordance with example embodiments, and FIG. 2C illustrates a process 260 of generating vectorized string differences between a source string and a target string for use with fuzzy matching the source string to the target string in accordance with example embodiments. The vectorized string differences may include a Levenshtein distance value computed in the example of FIG. 2A, the edit operation attributes determined in the example of FIG. 2B, and other attributes that identify differences between the source string and the target string.

Referring to FIG. 2A, a request is received to match together a source string 202 and a target string 204. The request may be received from a software process such as a machine learning model, a web service, a software application, and the like. As another example, the request may be input by a user via a user interface such as by selecting a button or other field or option. In this example, the host platform may compare the characters in the source string 202 to the characters in the target string 204 to calculate a Levenshtein distance.

In the example of FIG. 2A, the host platform divides the source string 202 (i.e., the name 'Robert Carter') into two substrings (i.e., 'Robert' and 'Carter'). Likewise, the host platform divides the target string 204 (i.e., the term 'Rob Baker') into two substrings (i.e., 'Rob' and 'Baker'). It should also be appreciated that the host platform may not divide the source and the target into substrings, but instead may perform the fuzzy analysis on the entire strings, and that the technique can generalize to multiple names beyond those composed of first and last names.

Next, the host platform determines the Levenshtein distance between the source string 202 and the target string 204. However, in this example, the host platform generates two Levenshtein distances 206 and 208 corresponding to a Levenshtein distance between the first respective substrings (i.e., the distance between 'Robert' and 'Rob') and a Levenshtein distance between the second respective substrings (i.e., 'Carter' and 'Baker'). The Levenshtein distance between two strings (or substrings) is the minimum number of single-character edits (insertions, deletions, and/or substitutions) required to change one word into the other.

In this example, the host platform divides both the source string 202 and the target string 204 into substrings to compare respective first names from the source string 202 and the target string 204 and separately compare respective last names from the source string 202 and the target string 204. If either of the substrings is not a match, the host platform may determine that the source string 202 and the target string 204 are not a match. However, if both sets of substrings are a match, then the source string 202 may be considered a match (i.e., referring to the same name or other entity). The decision to divide the strings may be incorporated within rules of the host platform.

Referring to FIG. 2B, the host platform may identify additional edit operation attributes of the source string 202 and the target string 204. For example, the host platform may identify which particular edit operation types are needed from among insertion operations, deletion operations, and substitution operations, as well as a count of each of the different types of operations. In this example, it takes three deletions to convert the source substring 'Robert' into the target substring 'Rob'. Meanwhile, it takes two substitutions and one deletion to convert the source substring 'Carter' into the target substring 'Baker'. While both of these conversions may require the same number of edit operations (i.e., three operations), the types of operations are different. It should be appreciated that multiple choices of edit operations may yield the same conversion process from source string 202 to target string 204, such that ties can be either arbitrarily broken or broken by a given policy, depending on the embodiment.

The host platform may identify the types of edit operations 211 that are performed to convert the source substring 'Robert' into the target substring 'Rob' shown in fields 213,

214, and 215 of a table. Also, the table may include a field 216 for the value of the Levenshtein distance determined in FIG. 2A. Likewise, the host platform may identify the types of edit operations 221 that are performed to convert the source substring 'Carter' into the target substring 'Baker' as shown in fields 224, 225, and 226 of a table. Also, the table may include a field 227 for the value of the Levenshtein distance determined in FIG. 2A.

In addition, the host platform may compute a median character position of the edit operations shown in the respective tables and generate median character position values such as median delete position value 212, median substitution position value 222 and median delete position value 223. As a side note, the host platform may perform a similar computation to determine a median insertion position. The median position may be determined by normalizing the analysis to the maximum index of the longest string. In the case where the maximum index is zero, or in the case where both strings have zero length, then the calculation reduces to at most a single character comparison, which should be treated in the obvious manner to check for equality. In the example of FIG. 2B, the longest string in the last name comparison is CARTER. Also, in this example, the first character 'C' is considered to be in position zero while the last character 'R' is considered to be in position five. Therefore, the median substitution position is $1.5/5=0.3$, where 1.5 is the median position among the substitution operations, i.e. 0 and 3 in the example shown in FIG. 2B, and five represents the maximum index of the longest string.

FIG. 2C illustrates a process 260 of encoding the edit operation attributes of the source string 202 and the target string 204 into vectors. In this example, a first vector 240 is generated for matching together the first substrings of each of the source string 202 and the target string 204. Likewise, a second vector 250 is generated for matching together the second substrings from the source string 202 and the target string 204.

When generating the vectors 240 and 250, the host platform may encode the attributes identified in FIGS. 2A and 2B into the respective vectors. For example, the host platform may encode the Levenshtein distance, the median character location, the types of edit operations, the count of each edit operation, the target string, the source string, a ratio representing a difference in size between the source string and the target string, and a number of characters in size by which the source string and the targets string differ. In the example of FIG. 2C, the host platform performs this process twice to create two vectors 240 and 250 for comparing the two respective substrings.

FIG. 3 illustrates a process 300 of comparing string values via machine learning in accordance with example embodiments. Referring to FIG. 3, the host platform may host or otherwise query a machine learning model 310 to perform fuzzy matching, for example, based on the vectors 240 and 250 created in FIG. 2C. The machine learning model 310 may be a deep learning neural network that is trained to match two strings together based on edit operation attributes encoded within vectors of the respective strings. However, before the strings can be compared by the machine learning model 310, the strings need to be converted into a format that can be understood by the machine learning model 310 (i.e., into vectors 240 and 250). To do this, the host platform may convert the text content and the edit operation attributes into numbers that are encoded within the respective vectors 240 and 250.

The host platform may input the vector 240 into the machine learning model 310. In response, the machine learning model 310 may output a determination as to whether the two substrings (i.e., Robert and Rob) are a match. In this case, the machine learning model 310 determines that these two substrings are a match in 312. Likewise, the host platform may input the vector 250 into the machine learning model. In response, the machine learning model 310 may output a determination as to whether the two substrings (i.e., Carter and Baker) are a match. In this case, the machine learning model 310 determines that these two substrings are not a match in 314.

Figure 4:
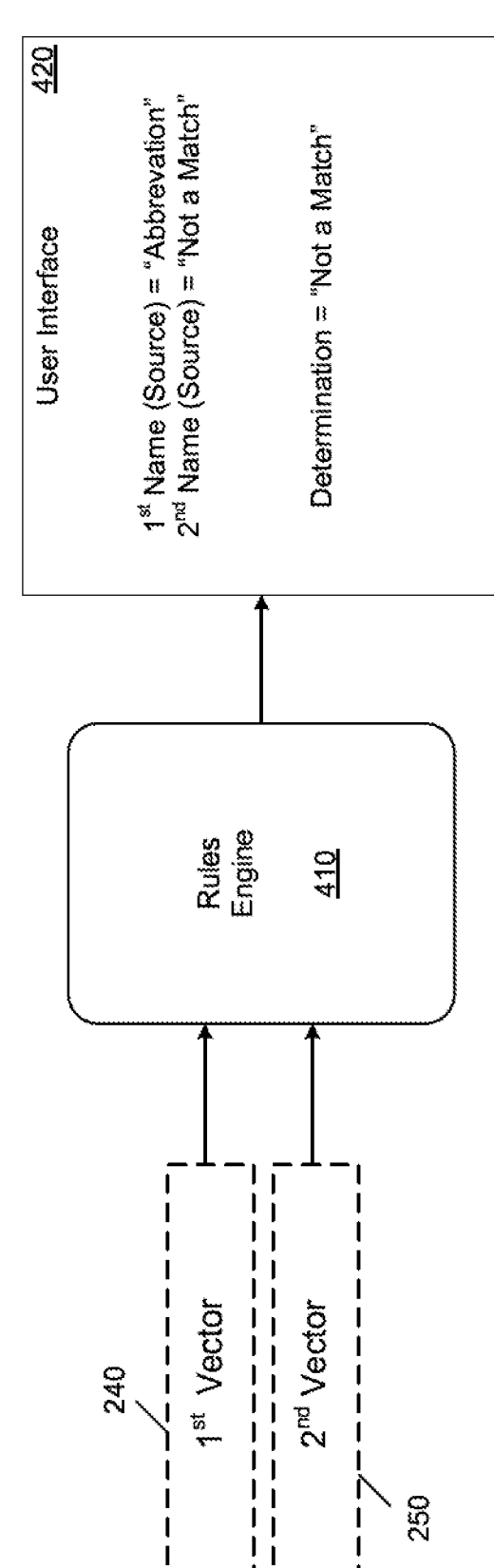
FIG. 4 is diagram illustrating a process of comparing string values via a rules engine in accordance with example embodiments.

In this example, the Levenshtein distance value is the same in both vectors 240 and 250. However, the types of edit operations and the locations of the edit operations are different. The machine learning model 310 may interpret these attributes differently based on the training of the model. Therefore, even though the number of edit operations is the same in both cases, only one of the substrings is a match. The resulting determinations may be stored in memory. In some embodiments, the determinations may be output by the machine learning model 310 and input to a rules engine such as shown in the example of FIG. 4. As another example, the rules engine may be executed without the machine learning.

FIG. 4 illustrates a process 400 of comparing string values via a rules engine 410 in accordance with example embodiments. In this example, the rules engine 410 uses static rules to compare the vectors 240 and 250 and determine that both substring comparisons must match for the overall match to occur. The rules engine 410 can also identify and generate labels describing the types of matches and display them on a user interface 420. The rules engine 410 can also generate and display a result of the matching process via the user interface 420. As another example, the machine learning model may be trained to identify types of matches and may be executed without the rules engine.

Figure 5:
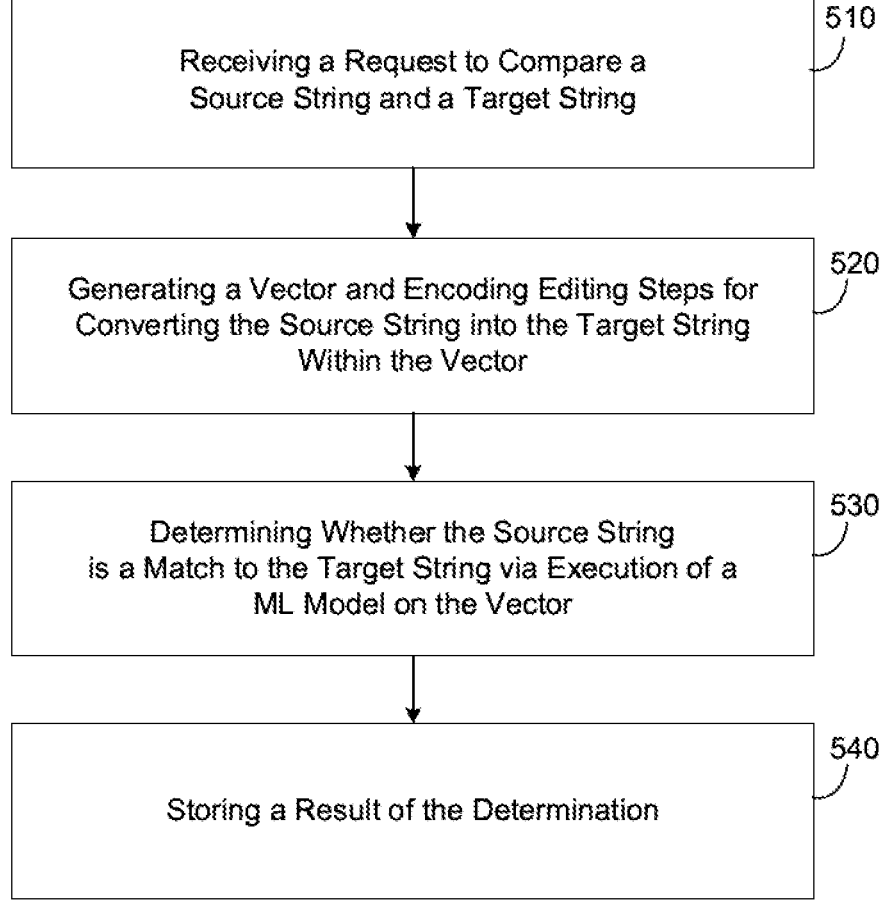
FIG. 5 is a diagram illustrating a method for generating a classifier for classifying transaction strings into categories in accordance with an example embodiment.

FIG. 5 illustrates a method for performing fuzzy string matching based on machine learning in accordance with an example embodiment. For example, the method 500 may be performed by a host platform as described herein. Referring to FIG. 5, in 510, the method may include receiving a request to compare a source string and a target string. For example, the request may be triggered by a host software application, a user input on a screen/page, another service/process requesting the comparison, or the like.

In 520, the method may include generating a vector and encoding attributes within the vector, wherein the attributes comprise editing steps for converting the source string into the target string. In 530, the method may include determining whether the source string is a match to the target string via execution of a machine learning model on the generated vector with the attributes encoded therein. In 540, the method may include storing a determination output of the machine learning model in memory.

In some embodiments, the attributes may include a number of edit operations for converting the source string into the target string. In some embodiments, the attributes may include a location of a character within the source string where the editing steps apply. In some embodiments, the attributes may include a difference in size between the source string and the character string. In some embodiments, the attributes may include identifiers of one or more of delete operations, insert operations, and substitution operations to be applied to the source string to convert the source string into the target string.

In some embodiments, the attributes may further include a count of one or more of the delete operations, a count of the insert operations, and a count of the substitution operations. In some embodiments, the attributes may include a Levenshtein distance between the source string and the target string. In some embodiments, the executing may include executing the machine learning model to determine whether the source string and the target string correspond to a same name.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
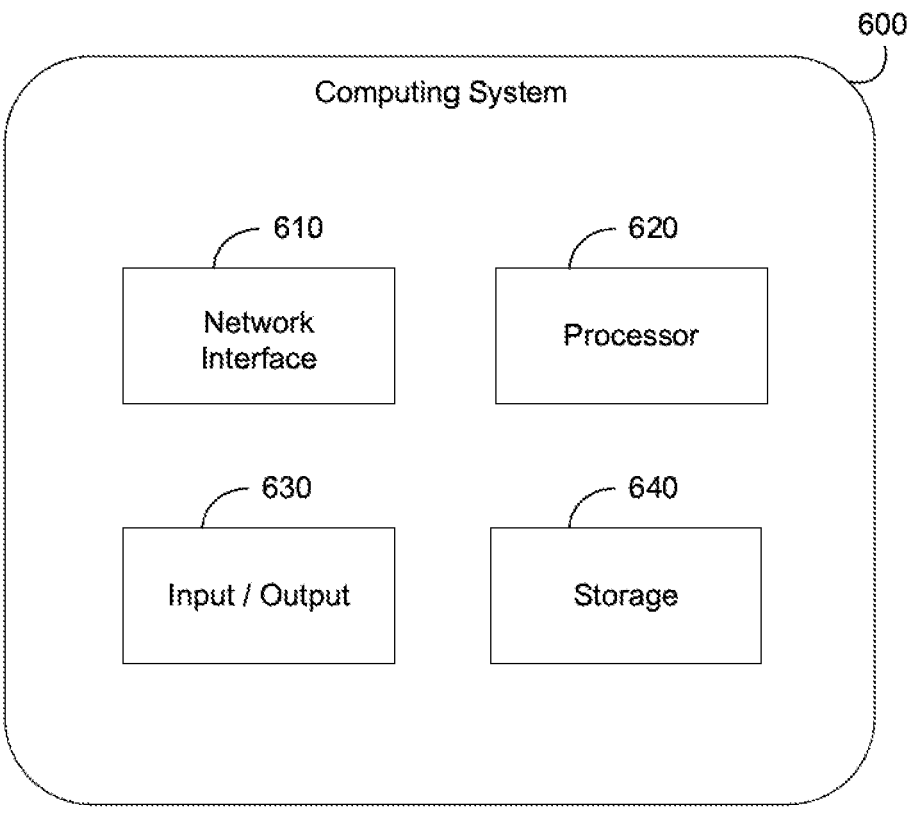
FIG. 6 is a diagram illustrating an example of a computing system for use in any of the examples described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative configuration, the processor and the storage medium may reside as discrete components. For example, FIG. 6 illustrates an example computing system 600 which may process or be integrated in any of the above-described examples, etc. FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 600 may be, contain, or include a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, a processor 620 (or multiple processors/cores), an input/output 630, which may include a port, an interface, etc., or other hardware, for outputting a data signal to another device such as a display, a printer, etc., and a storage device 640, which may include a system memory, or the like. Although not shown, the computing system 600 may also include a system bus that couples various system components, including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 640 can read and write to a non-removable, non-volatile magnetic media (not shown and typically called a "hard drive") and/or a solid-state drive (SSD). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, and/or a flash drive, such as USB drive or an SD card reader for reading flash-based media, can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

The invention claimed is:

1. A computing system comprising:
a memory configured to store a machine learning model; and
a processor configured to:
receive a request to execute one or more verifications related to a user;
receive a request to match a source string and a target string;
generate a vector including editing operation attributes encoded within the vector, the attributes including an indication of a value representing a minimum number of editing operations to change the source string into the target string, one or more editing operation types and their associated counts for converting the source string into the target string;
generate, by an execution of a machine learning model having an input including the encoded vector, an output including an indication of whether the source string is a match to the target string;
store the output of the machine learning model in the memory; and
provide an indication of the output of the machine learning model to one or more systems to execute the requested one or more verifications related to the user, the one or more verifications including at least one of a deduplication of duplicate records and an identity verification.

2. The computing system of claim 1, wherein the attributes further comprise a location of a character within the source string where the editing steps apply.

3. The computing system of claim 1, wherein the attributes further comprise a difference in size between the source string and the character string.

4. The computing system of claim 1, wherein the one or more editing operation types include a delete operation, an insert operation, and a substitution operation to be applied to the source string to convert the source string into the target string.

5. The computing system of claim 1, wherein the attribute of the indication of a value representing a minimum number of editing operations to change the source string into the target string comprises a Levenshtein distance between the source string and the target string.

6. The computing system of claim 1, wherein the processor executes the machine learning model to determine whether the source string and the target string correspond to a same name.

7. A method comprising:
receiving a request to execute one or more verifications related to a user;
receiving a request to compare a source string and a target string;
generating a vector including editing operation attributes encoded within the vector, the attributes including an indication of a value representing a minimum number of editing operations to change the source string into the target string, one or more steps operation types and their associated counts for converting the source string into the target string;
generating, by an execution of a machine learning model having an input including the encoded vector, an output including an indication of whether the source string is a match to the target string;
storing the output of the machine learning model in memory; and
providing an indication of the output of the machine learning model to one or more systems to execute the requested one or more verifications related to the user, the one or more verifications including at least one of a deduplication of duplicate records and an identity verification.

8. The method of claim 7, wherein the attributes further comprise a location of a character within the source string where the editing steps apply.

9. The method of claim 7, wherein the attributes further comprise a difference in size between the source string and the character string.

10. The method of claim 7, wherein the one or more editing operation types include a one or more of delete operation, an insert operation, and a substitution operation to be applied to the source string to convert the source string into the target string.

11. The method of claim 7, wherein the attribute of the indication of a value representing a minimum number of editing operations to change the source string into the target string comprise a Levenshtein distance between the source string and the target string.

12. The method of claim 7, wherein the processor executes the machine learning model to determine whether the source string and the target string correspond to a same name.

13. A non-transitory computer-readable medium comprising instructions which when executed by a computer cause a processor to perform a method comprising:

receiving a request to compare a source string and a target string;

generating a vector including editing operation attributes encoded within the vector, the attributes including an indication of a value representing a minimum number of editing operations to change the source string into the target string, one or more steps operation types and their associated counts for converting the source string into the target string;

generating, by an execution of a machine learning model having an input including the encoded vector, an output including an indication of whether the source string is a match to the target string;

storing the output of the machine learning model in memory; and providing an indication of the output of the machine learning model to one or more systems to execute the requested one or more verifications related to the user, the one or more verifications including at least one of a deduplication of duplicate records and an identity verification.

14. The non-transitory computer-readable medium of claim 13, wherein the attributes further comprise a location of a character within the source string where the editing steps apply.

15. The non-transitory computer-readable medium of claim 13, wherein the attributes further comprise a difference in size between the source string and the character string.

* * * * *